June 19, 1951     H. DANUSER     2,557,637
EARTH BORING APPARATUS

Filed March 10, 1945     2 Sheets-Sheet 1

INVENTOR.
Henry Danuser
BY Lawrence H. Cohn

June 19, 1951  H. DANUSER  2,557,637
EARTH BORING APPARATUS
Filed March 10, 1945  2 Sheets-Sheet 2

INVENTOR.
Henry Danuser
BY Lawrence H. Cohn

Patented June 19, 1951

2,557,637

UNITED STATES PATENT OFFICE 2,557,637

EARTH-BORING APPARATUS

Henry Danuser, Fulton, Mo.

Application March 10, 1945, Serial No. 581,987

2 Claims. (Cl. 255—19)

This invention relates generally to earth-boring apparatus, and has particular reference to an improved post-hole digger.

The principal object of the invention is to provide an improved earth-boring implement or attachment for a farm tractor, which derives the power for its operation therefrom.

More specifically, the objects of the invention are to provide a highly efficient hole-digging implement of the character stated, of simple, rugged construction, which can be easily and quickly assembled and attached to a tractor and operated by a single person.

Other objects and advantages reside in improved provisions for supporting the auger assembly and for raising and lowering the same, embodied in a pivoted, arcuately movable supporting structure, and an important object of the invention is attained in simplified, highly effective means for moving the auger assembly relative to and coordinately with the movement of the supporting structure whereby to effect a substantially rectilinear movement of the auger into and out of the earth.

Another object is directed to the provision of an earth-boring implement for a farm tractor of well known manufacture, which utilizes to best possible advantage the three-point attachment facilities provided thereon.

These and a number of other objects and advantages will appear in the following description, reference being made to the accompanying drawings wherein.

Figure 5:
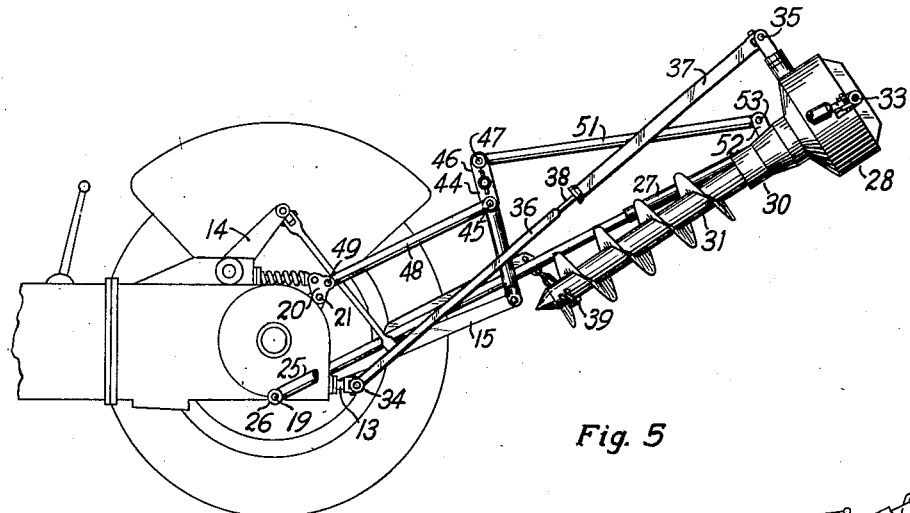
Figures 6, 7:
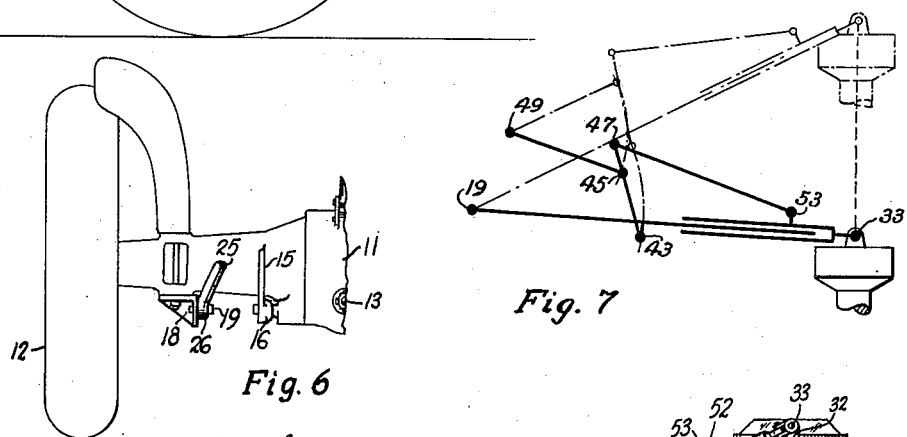
Figure 4:
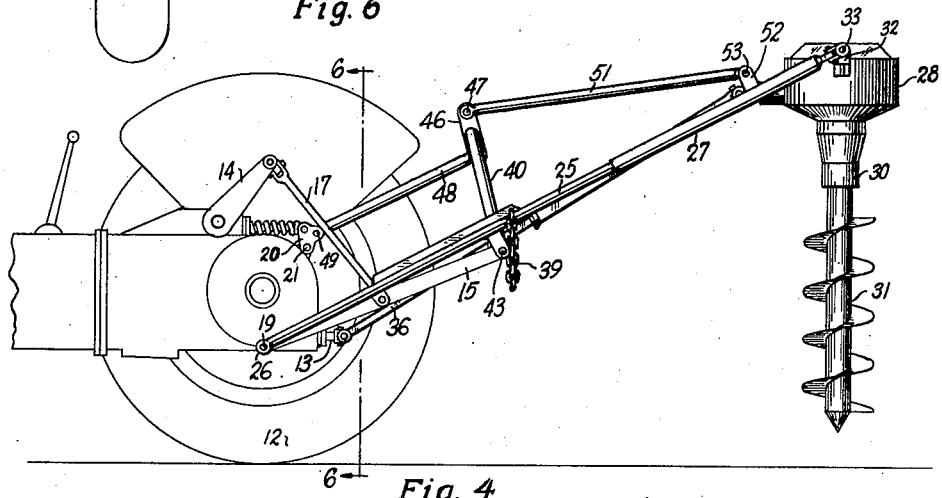
Fig. 4 is a side elevational view, similar to that of Fig. 2, but illustrating the implement in a raised position, or at the beginning of a boring stroke.

Fig. 5, a side elevational view, illustrates the implement raised and with the auger assembly secured in a non-operating position as for transportation purposes, one supporting arm of the implement being broken away;

Fig. 6 is a fragmentary sectional view taken at line 6—6 of Fig. 4, and

Fig. 7 is a diagrammatic side elevational view illustrating in full and broken lines respectively the positions of the members when the implement is disposed at the lower and upper limits of travel.

Although not limited in its application to a vehicle of any particular type or manufacture, the earth-boring implement of my invention is especially adapted for installation on a tractor equipped with power-actuated means for lifting and controlling the operating height of an attached implement. In the accompanying drawings the rear axle organization of a well known make of tractor embodying such means is shown generally. Such organization includes the transmission housing 10, axle housing 11, wheels 12, and a power take-off or drive shaft 13. Installed within housing 10 is a hydraulically actuated piston (not shown) connected to a bell-crank lever having paired arms 14 that extend externally of the housing. A pair of lift bars 15 spaced at opposite sides of the power take-off 13 are pivoted at their inner ends to the housing 11, ball-and-socket pivot connections indicated at 16 being employed for this purpose. Paired tension links 17 interconnect the powered lever arms 14 each to one lift bar 15, such that counterclockwise rocking of lever arms 14 effects a raising of the outer ends of lift bars 15. Means for connecting any one of a variety of implements at three points to the tractor include a pair of trunnion brackets 18 which are bolted to the underside of the axle housing, symmetrically spaced at opposite sides of the drive shaft 13, each bracket having an inwardly directed pin or trunnion 19 arranged coaxially with the lift-bar pivots 16. The third hitch point is located centrally between the brackets 18, spaced above and rearwardly of the axis of trunnions 19. Hitch provisions at the third point are constituted by a coupling member 20 pivoted to the axle housing at 21 and arranged to act against a compression spring 22. Under normal operating conditions the coupling member 20 does not rock on its pivot 21, and for purposes of the present invention and description, member 20 may be regarded as providing a fixed anchorage for the implement. The hydraulic raising and lowering of the lift bars 15 is under the full control of the operator by means not shown.

It will be understood that the means heretofore described constitute standard equipment of one type of tractor to which the implement of my invention may be connected.

Figure 1:
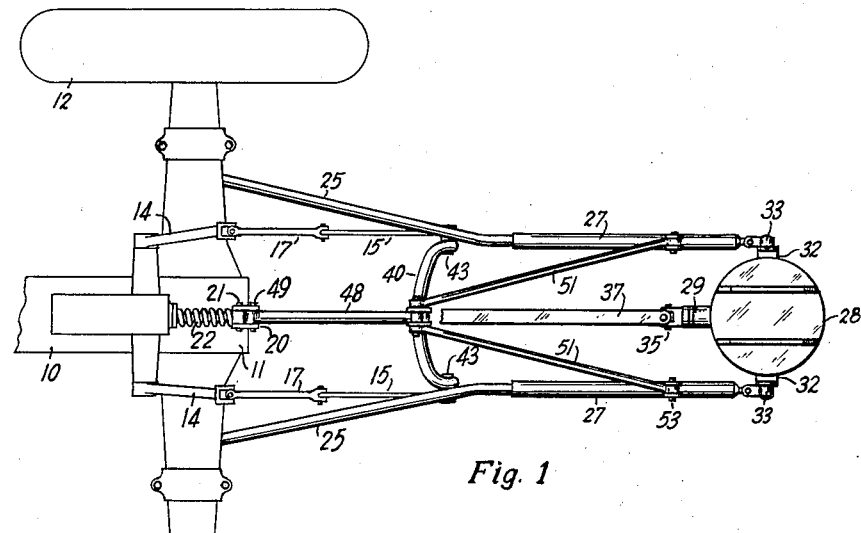
Fig. 1 is a plan view illustrating a boring implement of my invention in connection with the rear axle organization of a typical farm tractor to which the implement is particularly applicable.

Proceeding now to a description of my invention as embodied in an implement of presently preferred construction, reference numeral 25 designates each of a pair of so-called radius bars or arms, these constituting the principal supporting members for the auger assembly. In the present example the arms 25 are tubular. They are arranged in laterally spaced relation and are provided at their inner ends with bearing eyes 26 by which they are detachably mounted on the trunnion pins 19 for pivotal movement in spaced, vertical planes. As appears in Fig. 1, the arms 25 are preferably bent slightly near their centers so that they extend convergingly from their pivoted ends for approximately half their lengths, then continue in parallel spaced relation to their free ends.

Disposed for longitudinal sliding movement on the outer end portion of each arm 25 is a tubular member or sleeve 27, the arm portion and sleeve being in telescoping relation. Considered together, the sleeves 27 comprise a carriage for the auger assembly which is mounted suspendingly between the outer ends thereof. The auger assembly includes a tubular gear housing 28 containing a set of bevelled or helical gears (not shown), one thereof, the driving gear, being fixed to a short drive shaft 29 that extends horizontally through the side wall of the housing. The driven gear is mounted axially within the housing, fixed to a vertical shaft that terminates downwardly in a socket portion 30 that receives the upper end of an earth auger, designated generally 31. Diametrically arranged on opposite sides and near the top of gear housing 28 are mounting ears 32, and connection between the ears 32 and the ends of sleeve 27 is made preferably by means of ball-and-socket fittings 33. The described manner of mounting the auger assembly on the sleeves 27 enables the auger normally to assume a vertical position. In the event that the auger encounters a ground obstruction when being moved from one location to another it is free to swing and pass over the obstruction and thereby avoid damage to the implement. The provision of ball-and-socket connections 33 between the sleeves and the gear casing is advantageous because it eliminates all tendency of the sleeves to bind on their respective arms, as might otherwise result, for example, as a consequence of lateral forces acting on the auger assembly.

Power for rotating the auger is transmitted from the power take-off 13 at the tractor to the bevel gear drive 29 for the auger, by means of an extensible drive shaft connected to those members through universal joints 34 and 35. The extensible drive shaft comprises a solid part 36 of square or other non-circular section, connected to universal joint 34, that extends telescopically into a tubular part 37 of corresponding cross-sectional shape, the part 37 being connected to universal joint 35. It will be understood that outward sliding movement of sleeves 27 on the radius arms 25 is accompanied by a corresponding elongation of the drive shaft.

Under all normal operating positions of the auger, the two sections 36 and 37 of the drive shaft interengage each other for the transmission of power at their junction. The shaft section 36 is provided with a terminal part 38 (Fig. 5) of circular section and when, as for purposes of transportation, the auger is swung inwardly in a raised position and so held as by means of chain 39 as shown in Fig. 5, the terminal part of the tubular section 37 is caused to be drawn outwardly beyond the square part of section 36 and onto the circular terminal 38 thereof. When so related the shaft section 36 is free to turn relative to section 37.

As will be understood, the provisions for moving the auger assembly relative to and along the supporting arms 25 are for the purpose of enabling the auger to travel in a rectilinear rather than in an arcuate path. In the present device translatory movement of the auger is the resultant of the arcuate movement of the supporting arms 25 and radial movement of the auger along the said arms. My improved means by which the auger is caused to move radially on the arms 25 in coordination with the arcuate movement of said arms, so that the resultant path of travel, or the effective portion thereof, will be substantially rectilinear, are hereinafter described in detail.

Figure 3:
Fig. 3 is a plan view of the tie-bar member, as it would appear from a plane indicated by 3—3 of Fig. 2.

The arms 25 are joined together at points near their longitudinal centers by an arched yoke or tie-bar 40, illustrated in Fig. 3. This member is provided at its ends with bearing eyes 41 for detachable and pivotal connection with depending bearing lugs 42, a pair of which are provided on each arm 25. Removable pintles 43 extend through the paired bearing lugs 42 and couple thereto the tie-bar bearing eyes 41 and also the free ends of the lift bars 15 of the tractor. Tie-bar 40 is further provided at its crown with a pair of depending bearing lugs 44 which hold a removable pintle 45, and an upstanding pair of bearing lugs 46 having a removable pintle 47. A rigid link member 48 is connected at one end to the coupling member 20 on the tractor by means of a removable pintle 49, and at the opposite end to the depending lugs 44 of the tie-bar 40 by means of the pintle 45.

Rocking movement of the tie-bar 40 on the arms 25, incidental to the pivoting of the arms 25 and link 48 on their respective fixed pivots, is transmitted to the sleeves 27 by means of paired links 51 which are jointly connected to tie-bar bearing lugs 46 by the pintle 47 common thereto, and individually connected to sleeves 27 which have upstanding bearing lugs 52 and pintles 53 for the purpose.

The operation of the boring implement will be understood from the foregoing description, but for purposes of completeness may be explained as follows:

With the auger initially disposed in the position shown in Fig. 4 and with its pointed end directly overlying the desired location for the hole, power is supplied to the auger through shaft sections 36 and 37 to cause it to turn. The control for the lifting mechanism of the tractor is then properly actuated to lower the auger so that its pointed end penetrates the soil. In the tractor and lift mechanism exemplified herein the weight of implement acts downwardly on the ends of lift-bars 15 which are permitted to pivot under the influence of said weight when fluid is released from the cylinder space of the hydraulic mechanism. Downward movement of the auger is gravitational, and also the result of in-threading of the helical auger flight into the earth. The described lifting mechanism does not exert downward force on the implement.

Figure 2:
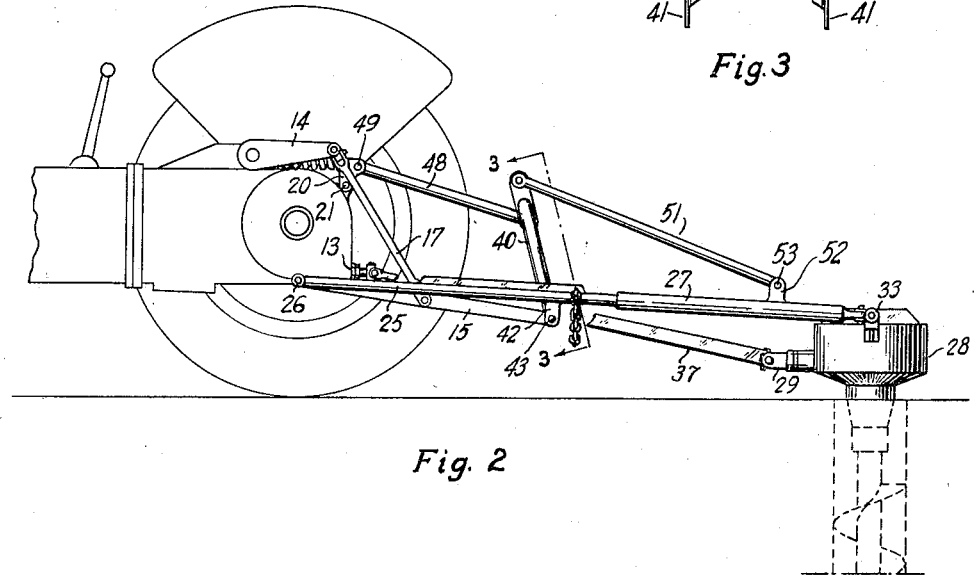
Fig. 2 is a side elevational view of the implement of Fig. 1, showing relative disposition of the parts at the completion of a boring stroke.

By referring to Fig. 7, for example, it will appear that the inner portions of arms 25 between pintles 19 and 43, the tie-bar 40 between pintles 43 and 45, the link 48 between pintles 45 and 49, and the axle portion between pintles 49 and 19, constitute a quadrilateral linkage. By reason of this linkage the tie-bar 40 is caused to rock forwardly on and relative to the arms 25 as the latter swing downwardly (compare Figs. 4 and 2), thus drawing the auger assembly inwardly so as to rectify the path of auger travel and cause it to descend in substantially a straight line.

At the completion of the stroke, hydraulic power supplied to the lifting mechanism causes the arms 25 pivotally to raise. The auger assembly moves outwardly along the arms under the action of the quadrilateral linkage and the resultant line of upward travel is substantially straight.

The proportionate lengths of the various elements constituting the described linkage system and the relative locations of the fixed pivot points 19 and 49 may be readily ascertained, and these factors will depend largely upon practical considerations, such as the locations on the tractor of suitable anchorage points for the arms 25 and the link 48, as well as upon the extent that the sleeves 27 are required to be moved along the arms 25 in order to effect vertical, substantially rectilinear travel of the auger. The degree of angular movement of the bar 40 on its pivot 43 necessary to impart the required longitudinal movement of the sleeves 27 determines the length of the link 48 and the location on the tie-bar of the pivotal connection 45.

By way of example and for purposes of completeness there is set forth below the lengths of the elements in a particular, practical embodiment of my invention, especially adapted for use on a Ford-Ferguson tractor wherein anchorage points for the fixed pivots 19 and 49 are provided and these are spaced apart 14⅛ inches vertically and 6¾ inches horizontally. With reference to Fig. 7, the distance between the designated pivot points in the machine of the example are as follows:

| | Inches |
|---|---|
| 19 to 33 (as measured along arm 25 when horizontal) | 75 |
| 19 to 43 (as measured along arm 25) | 32 |
| 53 to 33 (as measured along sleeve 27) | 12 |
| 49 to 45 | 22½ |
| 43 to 45 | 12¼ |
| 45 to 47 | 5½ |
| 47 to 53 | 35 |

While a specific form of the improved earth boring implement has been illustrated and described herein, it is desired to be understood that the same may be varied, within the scope of the appended claims, without departing from the spirit and full intendment of the invention.

What is claimed and desired to be secured by Letters Patent is:

1. In an earth boring implement, a pair of laterally spaced arms adapted to be pivotally mounted on a tractor for movement about a horizontal axis, an arched tie bar extending transversely between said arms and pivotally connected thereto for rocking movement thereon, an auger carriage slidable longitudinally on the outer end portions of said arms, an auger mounted on said carriage, a link pivoted at one end to swing about a horizontal axis on the tractor, spaced vertically from the axis for said arms, said link having its opposite end pivotally connected to the crown portion of said arched tie bar, and a link pivotally connected to and between the crown portion of said tie bar and said auger carriage, said links and tie bar coacting to cause said auger carriage to move along said arms and to follow a substantially vertical rectilinear path when said arms are moved about their pivot mountings.

2. In an earth boring implement for a tractor, a pair of laterally spaced arms adapted to be pivoted individually to the tractor for movement about a common horizontal axis thereon, said arms each having an angular bend therein, whereby the arms are adapted to extend convergingly from their pivoted ends to said bent portions, thence in parallel relation to their free ends; sleeve members slidable on the parallel end portions of said arms, an auger organization including a gear housing, ball and socket joints connecting said sleeves individually to said gear housing in supporting relation to the auger organization, an arched tie bar pivotally mounted at its ends to intermediate points on said arms, a link adapted to be pivoted at one end to the tractor and at the opposite end to the crown portion of said arched tie bar, links pivotally interconnected between said sleeves and said tie bar, said links and tie bar coacting to cause said auger organization to slide along said arms and to follow a substantially rectilinear path when said arms are pivoted about their mountings on the tractor.

HENRY DANUSER.

REFERENCES CITED

The following references are of record in the file of this patent:

UNITED STATES PATENTS

| Number | Name | Date |
|---|---|---|
| 1,504,299 | Wolfe | Aug. 12, 1924 |
| 1,612,186 | Gibson | Dec. 28, 1926 |
| 2,048,119 | Graham | July 21, 1936 |
| 2,217,300 | Templeton | Oct. 8, 1940 |
| 2,320,775 | Garner | June 1, 1943 |
| 2,410,508 | Lamme | Nov. 5, 1946 |